United States Patent
Ramirez Tobías et al.

(10) Patent No.: US 8,021,478 B2
(45) Date of Patent: Sep. 20, 2011

(54) PROCESS TO PRODUCE PORTLAND CEMENT CLINKER AND OBTAINED CLINKER

(75) Inventors: Homero Ramirez Tobías, Monterrey (MX); Carlos Enrique Castillo Linton, San Nicolás de Los Garza (MX)

(73) Assignee: Cemex Trademarks WorldWide Ltd., Brugg Bei Biel (CH)

( * ) Notice: Subject to any disclaimer, the term of this patent is extended or adjusted under 35 U.S.C. 154(b) by 928 days.

(21) Appl. No.: 11/659,372

(22) PCT Filed: Jul. 8, 2005

(86) PCT No.: PCT/IB2005/001942
§ 371 (c)(1),
(2), (4) Date: Oct. 2, 2007

(87) PCT Pub. No.: WO2006/016210
PCT Pub. Date: Feb. 16, 2006

(65) Prior Publication Data
US 2008/0092781 A1    Apr. 24, 2008

(30) Foreign Application Priority Data
Aug. 5, 2004    (MX) .................... PA/A/2004/007614

(51) Int. Cl.
*C04B 7/36* (2006.01)
*C04B 7/43* (2006.01)

(52) U.S. Cl. ....................................................... 106/739

(58) Field of Classification Search ................... 106/739
See application file for complete search history.

(56) References Cited

U.S. PATENT DOCUMENTS

| 3,251,701 A | | 5/1966 | Klein |
| 4,042,408 A | | 8/1977 | Murray et al. |
| 5,698,027 A | | 12/1997 | Borgholm et al. |
| 5,882,190 A | * | 3/1999 | Doumet ........................ 432/106 |
| 6,050,813 A | * | 4/2000 | Doumet ........................ 432/106 |
| 6,142,771 A | * | 11/2000 | Doumet ........................... 432/14 |
| 6,599,123 B2 | * | 7/2003 | Ramirez-Tobias et al. ..... 432/14 |
| 7,001,454 B2 | * | 2/2006 | Lopez-Gonzales et al. .. 106/739 |

FOREIGN PATENT DOCUMENTS

| CA | 2313862 | * | 1/2001 |
| EP | 0812811 | | 12/1997 |
| EP | 1277709 | | 1/2003 |
| EP | 1428804 | | 6/2004 |
| FR | 2797628 A1 | * | 2/2001 |
| JP | 02003128446 A | * | 5/2003 |
| WO | WO-90/15033 | | 12/1990 |
| WO | WO-96/26165 | | 8/1996 |

OTHER PUBLICATIONS

JP 02003128446 A (Ramirez Tobias et al.) May 8, 2003 abstract only.*
CA 2313862 A1 (Martinez et al.) Jan. 19, 2001 abstract only.*
FR 002797628 A1 (Martinez) Feb. 23, 2001 abstract only.*

* cited by examiner

*Primary Examiner* — Paul Marcantoni
(74) *Attorney, Agent, or Firm* — Blank Rome LLP

(57) ABSTRACT

A process for producing Portland cement clinker at low temperatures fixing the sulfur produced by burning high sulfur content coke fuel. The invention also describes a Portland cement clinker that includes new additional phases.

6 Claims, No Drawings

PROCESS TO PRODUCE PORTLAND CEMENT CLINKER AND OBTAINED CLINKER

FIELD OF THE INVENTION

This invention relates to a process to produce a cement clinker and, specifically, it relates to a process to produce low-temperature Portland cement clinker fixing the SO3 of the pet-coke produced by the firing of high sulfur content pet-coke.

BACKGROUND OF THE INVENTION

The processes and plants used to manufacture Portland cement clinker are well known. Generally, the manufacturing process consists in preparing a raw meal (raw mixture) comprising a mixture of materials such as limestone ($CaCO_3$), clay (argillaceous materials) (e.g., $SiO_2$, $Al_2O_3$) and iron minerals (e.g., $Fe_2O_3$). Typically, the raw meal preparation includes the steps of drying, pulverizing and supplying said materials in adequate proportions to achieve a clinker with the required composition to obtain a raw meal mixture having the final quality desired. Once the raw meal is prepared, pulverized and homogenized with the required composition, the next steps in the process of manufacturing of the Portland cement clinker are carried out: i) feeding said prepared raw meal to a kiln passing through a pre-heater; ii) calcining said preheated raw meal to transform the $CaCO_3$ into $CaO$ and $CO_2$; iii) feeding the calcined meal to a sintering kiln; and iv) sintering (also known as clinkering) the calcined meal to form the clinker phases such as tricalcium silicate (alite—$C_3S$), dicalcium silicate (belite—$C_2S$), tricalcium aluminate ($C_3A$) and tetracalcium aluminoferrite ($C_4AF$) and other minor phases.

In order to carry out this process, high amounts of energy are required during the drying, calcining and sintering (clinkering) steps to maintain the high temperatures in the process, which being about 1450° C., whereby requires the consumption of large amounts of fuel.

Currently, the availability of fuels with a high sulfur (S) content and their lower cost represent an opportunity for the cement industry, however, their use requires special operation and handling with new methods to facilitate their use without detriment to the continuous operation of the kiln.

One of the available lower cost fuels is petroleum coke having a high sulfur content. Due to its nature, it typically has a high elemental sulfur content (S) ranging from 4.5% to more than 7%. The sulfur included in the fuel has a significant effect when included in the combustion process in the manufacture of cement clinker. On the one hand, this type of fuel generates the heat necessary to maintain the high process temperature. On the other hand, it produces $SO_2$ which, added to the $SO_2$ coming from the sulfur content in the raw materials conventionally used to form the raw meal, represents a significant amount. This sulfur content can produce blockages in the preheater when precipitating in the colder zones of the preheater or the kiln (800-900° C.) if steps or special measures are not taken or adequate compensating methods are not used for processing.

As is known, the $SO_2$ contained both in the combustion gases as well as in the raw meals come in direct contact with the CaO (lime) and other compounds, forming sulfated calcium compounds (calcium sulfites and sulfates $CaSO_3$ and $CaSO_4$). When subjected to the high temperatures for forming the clinker phases, which are higher than the decomposition temperature, the sulfated compounds decompose again into $SO_2$ and CaO. The latter reacts to form new clinker compounds, and the $SO_2$ carried in the combustion gases returns back towards the kiln solids inlet to again react with incoming fresh CaO. In this way, a continuous cycle is set up with ever increasing sulfur concentrations. Upon reaching high enough concentrations of $SO_2$, and having no outlet, sulfur compounds precipitate on the coldest areas of the preheater forming accumulations and blockages, such as in the preheater, the fume chamber, in the kiln itself, etc. This causes disturbances in the continuous operation of the process by reducing efficiency and, in more serious cases, stops the operation altogether; for example, when rings form in the clinkering kiln.

In the art, there have been efforts attempting to design installations, equipment and/or processes to enable the use of high sulfur content solid fuels by seeking to solve the problems related to the formation and excessive accumulation of $SO_2$. However, the majority of the processes and/or plants to manufacture Portland cement clinker using high sulfur content solid fuel present certain disadvantages with respect to the complexity of the processes and equipment, as well as high costs. A more detailed discussion of efforts carried out in relation to this technology are established in U.S. Pat. No. 6,599,123 dated Jul. 29, 2003, entitled "Method for producing a cement clinker using coke with a high sulfur content". One proposed solution to the problems associated with the use of high sulfur content solid fuel is that which is described in U.S. Pat. No. 6,383,283 granted on May 7, 2002 to Joseph E. Doument, entitled "Control of the production of cement clinker through the analysis of sulfur in the final product". Unfortunately, the processes and/or plants referred to in said document, which use high sulfur content fuels in order to produce Portland cement clinker, are of no use for manufacturing a clinker at low temperatures where the raw meal does not include sulfurized components and agents that will encourage the creation of, new clinker phases.

Processes for the production of a cement clinker at low temperatures or with low energy consumption that reduce the consumption of fuel are done by introducing mineralizing agents into the raw feeding mixture. Conventionally, mineralizing agents such as fluorite ($CaF_2$) and calcium sulfate ($CaSO_4$) are used as components in raw meal. It is known that the addition of mineralizing agents may alter the speed at which the clinkering reaction occurs, thus speeding up the reaction and decreasing the energy required for the clinkering reaction.

For example, U.S. Pat. No. 5,698,027 describes a method and plant for producing mineralized Portland cement clinker, in which the preferred mineralizing source is a by-product of the desulferizing of combustion gases. The process and the plant described require equipment and additional stages for the treatment or feeding of the by-product of the combustion gases for the clinker production process. Furthermore, in order to avoid blockage or accumulation problems resulting from the decomposition of the calcium sulfate, the feeding of the mineralizing agent shall occur in: i) the calcination zone, ii) the tertiary air duct, or iii) the precalcination zone. U.S. Pat. No. 5,698,027 is wrong when it suggests that mineralizer must be fed directly into the raw meal introduced into the clinkering kiln. Likewise, it neither shows nor provides examples of how high sulfur content solid fuel (for example petroleum coke) can be used as a mineralizing source in all stages of the process.

Spanish Patent No. 8605210 granted to the Superior Council for Scientific Investigation, entitled "Procedure for obtaining low energy consumption clinker using fluorite and sulfates as raw components" provides a method in which raw meal is mixed together with fluorite and the sulfate component ($CaF_2+CaSO_4$). This Spanish patent does not mention the specific application of coke fuel with high sulfur content and its specific process, in which sulfur released by burning the fuel is fixed in the calcinated meal inside the clinkering kiln in order to create the sulfate component without the problems of accumulation and blockage that occur when using this kind of fuel. In due course, the method described uses a corrector of the resultant clinker composition in order to adjust the content of the phase formation agent.

International Publication No. WO 93/21122 dated Oct. 28, 1992, published in the name of Aalborg Portland A/S, entitled "Composition of Cement" describes the combination of a mineralized cement, in other a words a cement produced using a mineralizer, with an "expander" in order to obtain a significant reduction in the consumption of energy and low $CO_2$ and NO emissions. It is known that adding a mineralizing agent to the clinker will increase its reactivity in order to use less in the preparation of cement. This document refers to the fact that the sulfate component may be introduced into the kiln as part of the fuel, in other words using fuel that contains sulfur. However, it does not describe the specific application of a fuel that contains sulfur nor of a solid coke fuel with high sulfur content or a specific process in which sulfur released by burning fuel is fixed in the calcinated meal in the clinkering kiln in order to create the sulfate component, without having to deal with the problems faced when using these types of fuel.

In accordance with the above, there is no document in this field that describes or suggests a process for producing Portland cement clinker at low temperatures fixing sulfur produced by burning coke fuel with a high sulfur content greater than 6.5% in which no sulfated compounds are used in the raw meal. Furthermore, none of the above-mentioned documents describe the phases of the clinker produced by means of this process. Therefore, a process is needed that will allow clinker to be produced more economically and more efficiently at low temperatures using high sulfur content fuels such as petroleum coke. This will avoid problems of $CaSO_4$ decomposition as well as those problems linked to blockage and incrustations due to high concentrations of $SO_2$ and/or $SO_3$ in the system.

As a result, one of the aims of this invention is to provide a low energy process for producing cement clinker in which an increased percentage of sulfur generated by the combustion of solid fuel with a high sulfur content is established in the clinker, without the use of sulfated component in the raw meal and with the addition of an agent that encourages the formation of phases.

Another aim of this invention is to produce a clinker with new phases, but with characteristics similar to those of a Portland cement clinker.

A further aim of the invention is to provide a cement clinker that will eventually require the addition of a corrector of the resultant clinker composition depending on the quality and sulfur content of the solid fuel.

SUMMARY OF THE INVENTION

The invention involves a method for producing Portland cement clinker at low temperatures that includes the stages of: preparing a raw meal based on the Lime Saturation Factor (LSF), the Silica Module (SM) and the Alumina Module (AM) and the adjustment to the fineness of the raw mixture, the LSF being less than 1, the SM between 2 and 3 and the AM between 0 and 3, and the adjustment to the fineness shall be approximately 80% of the fineness in a mesh n.200 (approximately 75 microns); feeding the raw meal; preheating the raw meal; calcining the preheated raw meal; sintering the calcinated raw meal in order to produce the Portland cement clinker; and cooling the cement clinker; in which the control modules in stage a) for the preparation of raw meal are based on the sulfur content of the solid fuel that will be burnt and fixed in the calcinated raw meal; and where the raw meal does not include sulfated compounds but instead an agent is added in order to encourage the formation of clinker phases in the raw meal before step b) feeding; and the operating parameters of the kiln are controlled in order to allow an increased or total fixing of the sulfur generated by burning solid fuel in the calcinated raw meal such as $CaSO_4$ in order to create new additional phases.

The invention also includes the production of a Portland type cement clinker produced at low temperatures by burning petroleum coke with a sulfur content of at least 6.5%, where the clinker includes new additional phases.

DETAILED DESCRIPTION OF ILLUSTRATIVE PREFERRED EMBODIMENTS OF THE INVENTION

As we know, a conventional process for producing Portland cement clinker includes the steps of: i) feeding the raw meal; ii) preheating the raw meal using a preheating system; iii) precalcinating the preheated raw meal using a precalciner; iv) sintering the calcinated raw meal in a preferably rotating kiln in order to produce the cement clinker; and v) cooling the resultant cement clinker.

The raw meal fed to the rotating kiln is preheated and partially decarbonated in a preheating system and in a precalciner using the heat of the combustion gases drawn from the rotating kiln and from the precalciner. As the combustion gases and the raw meal are mixed, the lime (CaO) in the raw meal and the sulfur dioxide ($SO_2$) in the combustion gases react to form sulfated calcium compounds such as calcium sulfite ($CaSO_3$). The calcium sulfite is formed in the preheater and kiln inlet. The calcium sulfite reacts with the oxygen inside the preheating system to form calcium sulfate ($CaSO_4$), if there is enough oxygen. If there is not enough oxygen in the atmosphere at the kiln solids inlet to create a vigorously oxidizing atmosphere, the calcium sulfate may decompose into lime (CaO) and sulfur dioxide ($SO_2$) to generate accumulations in the kiln solids inlet. If there is not sufficient oxygen in the rotating kiln, carbon monoxide (CO) will be created which is a super reducer and which will facilitate the decomposition of the calcium sulfate at temperatures of less than 1500° C. This decomposition also leads to an increase in the sulfur dioxide concentration in the gas inside the kiln, which leads to deposits of sulfur compounds on the walls of the preheating system or in the kiln solids inlet. The deposits of sulfur compounds increase when it burns a solid fuel with a high sulfur content (i.e., over 6.5%), such as petroleum coke, due to the increased concentration of sulfur dioxide in the gas of the kiln. The increased sulfur circulation in the gases causes an increase in the amount of sulfated compounds. This can result in deposits to a degree sufficient to block the kiln inlet, the preheater (including the preheater cyclones and the lines connecting the cyclones), thus stopping production.

To ensure the efficient use of the petroleum coke with a high sulfur content (over 6.5% by weight), the raw meal must be subjected to a previous treatment to improve its physical-chemical characteristics. Therefore, the preparation of components of the raw meal mixture for the production of Portland cement clinker at low temperatures using this invention are carried out in accordance with the teachings of U.S. Pat. No. 6,599,123, which is included herein as reference.

For the treatment of the raw meal, also called targeted improvement, it is considered the evaluation and improvement of the burnability of the raw meal by means of adjustment to the control modules, the adjustment to the fineness of the raw meal measured in meshes n.200 (75 microns) and n.50 (300 microns).

The raw meal is generally composed of limestone ($CaCO_3$), clays ($SiO_2$, $Al_2O_3$) and iron mineral ($Fe_2O_3$), in adequate ratios to achieve the quality desired for the cement clinker, i.e., in an adequate amount of the compounds mainly required to form the clinker, for example, tricalcium silicate. Control of the ratios of the raw materials is carried out by means of the relationship of the compounds ($SiO_2$, $Al_2O_3$, CaO, $Fe_2O_3$) called control modules. In general said control modules are: the Lime Saturation Factor (LSF), Silica Module (SM) and Alumina Module (AM).

The control modules are calculated in accordance with the following equations:

a) Lime Saturation Factor $$LSF=CaO/(2.8SiO_2+1.18Al_2O_3+0.65Fe_2O_3).$$

b) Silica module $$SM=SiO_2/(Al_2O_3+Fe_2O_3).$$

c) Alumina module $$AM=Al_2O_3/Fe_2O_3$$

As is known, high values in the control modules, for example, in the Lime Saturation Factor (LSF), the Silica Module (SM) and the Alumina Module (AM), result in raw meals difficult to transform into clinker (low burnability), see Table 1. These show the burnability of the raw meal as a function of the LSF. In addition, we know that the fineness of the raw meal (particle size) also affects the burnability thereof, while for a finer raw meal (see Table 2) the burnability improves.

TABLE 1

% of Free Lime

| LSF | T = 1350.degree. C. | T = 1450.degree. C. |
|---|---|---|
| 88 | 1.415 | 0.408 |
| 90 | 1.63 | 0.815 |
| 92 | 2.068 | 0.827 |
| 94 | 3.0385 | 1.304 |
| 96 | 3.78 | 2.00 |
| 98 | 5.44 | 2.979 |

TABLE 2

| Mesh-200 (for LSF 92) | Sample | Mesh-200 (for LSF 98) | LSF 92 % of free lime | | LSF 98 % of free lime | |
|---|---|---|---|---|---|---|
| | | | 1380.degree. .C. | 1450.degree. .C. | 1380.degree. .C. | 1450.degree. .C. |
| 76.75 | 1 | 76.75 | 1.95 | 0.74 | * | * |
| 78.75 | 2 | 78.00 | 1.82 | 0.67 | 2.75 | 1.44 |
| 80.74 | 3 | 80.40 | 1.62 | 0.62 | 2.21 | 1.11 |
| 82.66 | 4 | 83.70 | 1.45 | 0.51 | 1.88 | 0.92 |
| 85.17 | 5 | 84.31 | 1.42 | 0.49 | 1.86 | 0.74 |
| 87.00 | 6 | 86.60 | 1.35 | 0.45 | 1.69 | 0.68 |
| 89.00 | 7 | 38.00 | 1.31 | 0.41 | 1.61 | 0.61 |

Using the treatment or optimization process of physical-chemical characteristics and the fineness of the raw meal, it is possible to make efficient use of a solid fuel with high sulfur content, thus avoiding problems linked to the burning of said fuel, in particular blockage during the preheater stages, blockage of the fume chamber and the formation of rings in the sintering kiln due to high concentrations of sulfur in combustion gases.

Using this invention, the values of the control modules for the formulation of the raw meal mixture will be modified or optimized as a result of the solid fuel with high sulfur content that will be burned. Preferably, the values of the control modules for the formulation of the raw meal mixture will be principally based on the amount of sulfur contained in the solid fuel to be burned, for example petroleum coke, which will be established at a higher percentage in the resulting clinker, such as calcium sulfate.

As well as conventional components (limestone [$CaCO_3$], clays [$SiO_2$, $Al_2O_3$] and iron mineral [$Fe_2O_3$]), the raw meal for this invention includes an agent that encourages the formation of phases or a mixture that is different to a sulfate compound. One preferred technique of this invention is the non-use of sulfated components in the raw meal. The agent used to encourage the formation of phases of the invention is selected from residual slag from the steel, copper, etc industries; calcium fluorosilicate, heavy metal salts such as zinc, copper, molybdenum; alkaline sodium, potassium or lithium salts, fluorite, slag from precious materials such as gold, silver and platinum. The agent used to encourage the formation of phases shall be added to the raw meal in an amount that will vary by approximately 0.1 to 1.0% of the weight of the raw meal.

The addition of the agent that will encourage the formation of phases in this invention or a mixture of agents that are non-sulfated compounds and which are not normally used in raw meal, can alter the speed at which the clinkering reaction occurs and decrease the consumption of energy required for said clinkering reaction in order to obtain the clinker at a temperature of approximately 1300° C.

After the raw meal has been treated in order to optimize its physical-chemical characteristics as mentioned above and after the agent for encouraging the formation of phases has been added in a proportion of approximately 0.1 to 1% of the total weight of said raw meal, it is fed into a preheater and subsequently into a precalciner in order to submit the optimized raw meal to heating, drying and decarbonating operations. This is carried out through close contact with the combustion gases of the fuel fed into the burner of the precalciner and/or into the main burner of the rotating clinkering kiln, in which the $\hat{S}$ produced as $SO_2$ mainly by the combustion gases of the petroleum coke with high sulfur content (greater than 6.5%), comes into close contact with the raw meal in order to fix itself in said raw meal and together with the CaO form sulfated compounds such as $CaSO_3$ and $CaSO_4$ among others, produced by the reaction of the lime (CaO) of the raw meal and the sulfur dioxide ($SO_2$) contained in said combustion gases.

The applicants for this invention have discovered that the use of an optimized raw meal that does not include the addition of sulfated components, but which includes at least one agent to encourage the formation of clinker phases, combined with the control of certain parameters of the process such as: i) residence time of the optimized raw meal, ii) control of the $SO_3$ and the $O_2$ in the kiln inlet ensures the oxidation of the sulfur compound provided by the fuel (for example coke with a sulfur content of at least 6.5%), iii) control of the CO in the kiln inlet in an amount less than or equal to 500 p.p.m, and iv) control of the temperature (between 1250 and 1300° C.) inside the kiln, allows increased, if not total fixing of the sulfur generated by burning solid fuel in the calcinated raw meal such as $CaSO_4$ in order to create new additional desired phases, such as $C_4A_3\hat{S}$ and/or $C\hat{S}$.

Subsequently, a corrector of the resultant clinker composition is used in order to adjust the content of the agent to encourage the formation of phases. Said corrector of the composition is selected from a group including anhydrate, bastnasite, pyrite, langbeinite, barium, any industrial residue that contains sulfur, gases resulting from the desulferization of combustion gases, cement kiln powders, etc.

In other words and as established in U.S. Pat. No. 6,599,123, reducing the temperature in the clinkering stage is fundamental as an operational measure in order to be able to use coke with high sulfur content (for example, at least 6.5%), thus avoiding as far as possible problems associated with said coke.

According to the invention, the operating conditions of the clinkering kiln must be selected in such a way that, together with the optimized raw material, the agent to encourage the formation of clinker phases and the above-mentioned controls, the sulfur of the petroleum coke with high sulfur content, i.e. with more than 6.5% of the weight of sulfur can be efficiently fixed in the clinker.

An important factor to achieve reduction of the clinkering temperature and to minimize the problems related to the sulfated compounds produced by the reaction of CaO and the combustion gases of the fuel with high sulfur content to obtain a clinker with adequate properties, resides in the measurement of the sulfur content which is fixed and which is a part of the clinker composition measured as $SO_3$. The control parameter for the $SO_3$ in the clinker is established as a function of the produced sulfur is produced by means of burning the solid fuel.

The process for producing cement clinker of the present invention, also considers as another important factor for the control of the process, the measurement of the $SO_3$ in the calcinated material coming from the previous cyclone to the kiln inlet, the increase in the $SO_3$ content in this calcinated material indicates that the sulfur cycle (inside the system) is concentrating. Thus, the clinker produced in the rotating clinkering kiln utilizing the process of the present invention using coke with a high sulfur content allows for a reduction in, and even eliminates the need for, the addition of a corrector of the resultant clinker composition (e.g., gypsum ($CaSO_4 \cdot 2H_2O$)) in the cement, as regulator of the setting times.

We provide the following examples only for illustrative purposes and in no way are they intended to limit the scope of the present invention.

EXAMPLES

Example 1

A raw meal is prepared based on a solid fuel with high sulfur content, such as petroleum coke with more than 8.5% sulfur. The materials of which the raw meal is composed include limestone and clays and are treated in order to prepare an optimized raw meal of which 65.3% of its weight is limestone and 29.3% of its weight is clay, based on the total weight of the raw meal, which exhibits the following control modules:

| Materials | |
|---|---|
| Limestone | 65.3% |
| Clays | 29.3% |
| LFS | 95-96% |
| SM | 2.7-2.8 |
| AM | 2.8-2.9 |

Before the optimized raw meal is fed, fluorite is added in the amount of 0.25% based on the total weight of the optimized raw meal in order to encourage the formation of phases.

The optimized raw meal is fed into a clinkering kiln passing through a preheater and a precalciner where $SO_3$ and $O_2$ content is controlled at the kiln inlet in order to ensure oxidation of the sulfur compound, and it is checked that CO content at the kiln inlet is less than or equal to 500 p.p.m. The clinkering reaction in the kiln takes place at a temperature of 1300° C. and adequate residence time is required in order to allow increased fixing of up to 100% of the sulfur generated by the burning of the solid fuel in the calcinated raw meal such as $CaSO_4$ and other sulfated compounds. This will create a clinker with the following additional mineralogical phases:

| Mineralogical phases of the clinker | |
|---|---|
| $C_3S$ | ++++ |
| $C_2S$ | +++ |
| $C_3A$ | ++ |
| $C_4AF$ | ++ |
| $C_4A_3\hat{S}$ | + |
| $C\hat{S}$ | + |

Once the clinkering reaction has occurred and new additional phases have been formed, the clinker is conducted to a grill cooler where the resulting clinker has the following composition:

| Compound | Clinker (%) |
|---|---|
| $SiO_2$ | 21.34 |
| $Al2O_3$ | 5.77 |
| $Fe_2O_3$ | 2.02 |
| CaO | 64.80 |
| MgO | 1.37 |
| $SO_3$ | 3.12 |
| $Na_2O$ | 0.36 |
| $K_2O$ | 0.74 |
| $TiO_2$ | 0.24 |
| $P_2O_5$ | 0.08 |
| $Mn_2O_3$ | 0.05 |
| $CaF_2$ | 0.51 |
| TOTAL | 100.4 |
| Free Lime | 1.05 |
| LFS | 95.46 |
| SM | 2.74 |
| AM | 2.86 |

Example 2

A raw meal is prepared using a solid fuel with a high sulfur content, such as petroleum coke with more than 8.5% sulfur. The materials of which the raw meal is composed include limestone, clays, iron mineral and T ash and are treated in order to prepare an optimized raw meal of which 66.4% of its weight is limestone, 29.1% clays, 1.5% iron mineral and between 3.0% and 5.0% T ash, based on the total weight of the raw meal, which exhibit the following control modules:

| Materials | |
|---|---|
| Limestone | 66.4% |
| Clays | 29.1% |
| Iron Mineral | 1.5% |
| Ash T | 3.0 a 5.0% |
| LFS | 96-97% |
| SM | 2.0-2.4 |
| AM | 1.9-2.0 |

Before the optimized raw meal is fed, fluorite is added in the amount of 0.30% based on the total weight of the optimized raw meal in order to encourage the formation of phases.

The optimized raw meal is fed into a clinkering kiln passing through a preheater where $SO_3$ and $O_2$ content is controlled at the kiln inlet in order to ensure oxidation of the sulfur compound, and it is checked that CO content at the kiln inlet is less than or equal to 500 p.p.m. The clinkering reaction in the kiln takes place at a temperature of 1300° C. and adequate residence time is required in order to allow increased fixing of up to 100% of the sulfur generated by the burning of the solid fuel in the calcinated raw meal such as $CaSO_4$ and other sulfated compounds. This will create a clinker with the following additional mineralogical phases:

| Mineralogical phases of the clinker | |
|---|---|
| $C_3S$ | ++++ |
| $C_2S$ | +++ |
| $C_4AF$ | ++ |
| $C_3A$ | ++ |
| $C\underline{S}$ | + |

Once the clinkering reaction has occurred and new additional phases have been formed, the clinker is conducted to a satellite cooler where the resulting clinker has the following composition:

| Compound | Clinker (%) |
|---|---|
| $SiO_2$ | 20.32 |
| $Al_2O_3$ | 5.91 |
| $Fe_2O_3$ | 3.16 |
| CaO | 63.79 |
| MgO | 1.26 |
| $SO_3$ | 2.99 |
| $Na_2O$ | 0.29 |
| $K_2O$ | 1.09 |
| $TiO_2$ | 0.26 |
| $P_2O_5$ | 0.10 |
| $Mn_2O_3$ | 0.12 |
| $CaF_2$ | 0.71 |
| TOTAL | 100.0 |
| Free Lime | 0.77 |
| LFS | 96.75 |
| SM | 2.24 |
| AM | 1.87 |

Example 3

A raw meal is prepared based on a solid fuel of petroleum coke with more than 8.5% sulfur in order to produce a white clinker. The materials of which the raw meal is composed include limestone and kaolin and are treated in order to prepare an optimized raw meal of which 80% of its weight is limestone and 19.75% of its weight is kaolin, based on the total weight of the raw meal, which exhibits the following control modules:

| Materials | |
|---|---|
| Limestone | 80.0% |
| Kaolin | 19.75% |
| LFS | 95-97% |
| SM | 2.7-2.8 |
| AM | 2.8-2.9 |

Before the optimized raw meal is fed, fluorite is added in the amount of 0.25% based on the total weight of the optimized raw meal in order to encourage the formation of phases.

The optimized raw meal is fed into a clinkering kiln passing through a preheater and a precalciner where $SO_3$ and $O_2$ content is controlled at the kiln inlet in order to ensure oxidation of the sulfur compound, and it is checked that CO content at the kiln inlet is less than or equal to 500 p.p.m. The clinkering reaction in the kiln takes place at a temperature of 1350° C. and adequate residence time is required in order to allow increased fixing of up to 100% of the sulfur generated by the burning of the solid fuel in the calcinated raw meal such as $CaSO_4$ and other sulfated compounds. This will create a clinker with the following additional mineralogical phases:

| Mineralogical phases of the clinker | |
|---|---|
| $C_3S$ | ++++ |
| $C_2S$ | +++ |
| $C_3A$ | NO |
| $C_4AF$ | NO |
| $C_4A_3\underline{S}$ | + |
| $C\underline{S}$ | + |

Once the clinkering reaction has occurred and new additional phases have been formed, the clinker is conducted to a grill cooler where the resulting clinker has the following composition:

| Compound | White clinker (%) |
|---|---|
| $SiO_2$ | 22.69 |
| $Al_2O_3$ | 5.82 |

| Compound | White clinker (%) |
|---|---|
| $Fe_2O_3$ | 0.18 |
| CaO | 66.76 |
| MgO | 0.73 |
| $SO_3$ | 3.37 |
| $Na_2O$ | 0.08 |
| $K_2O$ | 0.11 |
| $TiO_2$ | 0.06 |
| $P_2O_5$ | 0.07 |
| $Mn_2O_3$ | 0.01 |
| $CaF_2$ | 0.46 |
| TOTAL | |
| Free Lime | 1.11 |
| LFS | 94.67 |
| SM | 3.78 |
| AM | 32.33 |

Even though the invention has been illustrated and described to a certain extent, we must emphasize the fact that numerous possible modifications may be required for this invention. Therefore, the invention should not be considered to be restricted in any way except by that which is demanded by the above technique and by the spirit of the attached claims.

The invention claimed is:

1. A method for producing Portland cement clinker at low temperatures below 1380° C., said method including the stages of:
   a) preparing a raw meal based on a Lime Saturation Factor (LSF), a Silica Module (SM) and an Alumina Module (AM) and an adjustment of a fineness of a raw mixture, with the LSF being less than 1, the SM between 2 and 3 and the AM between 0 and 3, and the adjustment of fineness being approximately 80% of the fineness in a mesh n.200 (approximately 75 microns);
   b) feeding the raw meal;
   c) preheating the raw meal;
   d) calcinating the preheated raw meal;
   e) sintering the calcinated raw meal in order to produce a Portland cement clinker; and
   f) cooling the cement clinker;
   the method being characterized by the following:
   the control modules in stage a) for preparation of the raw meal are based on sulfur content of a solid fuel that will be burned and fixed in the calcinated raw meal;
   the raw meal does not include sulfated compounds, but instead it contains an agent that is added in order to encourage formation of clinker phases in the raw meal before step b) feeding; and
   the operating parameters of the kiln are controlled as follows:
   i) Residence time of the raw meal in a kiln;
   ii) $SO_3$ and $O_2$ at an inlet of the kiln in order to ensure oxidation of the sulfur compound created by the fuel with a sulfur content of at least 6.5%;
   iii) CO at the kiln inlet less than or equal to 500 p.p.m.; and
   iv) Temperature in the kiln between 1250 and 1300° C.;
   in order to allow, if not total, at least increased fixing of the sulfur generated by burning solid fuel in the calcinated raw meal such as in order to create new additional phases.

2. A process according to claim 1, also characterized by the fact that the solid fuel used to preheat, decarbonate and sinter the raw meal is petroleum coke with a sulfur content of more than 6.5% of its total weight.

3. A process according to claim 1, also characterized by the fact that the agent used to encourage the formation of clinker phases is selected from the group consisting of: residual slag from making steel or copper; calcium fluorosilicate, heavy metal salts alkaline sodium, potassium or lithium salts, fluorite, and slag from precious materials.

4. A process according to claim 1, characterized by the fact that it includes the step of:
   adding a corrector of the resultant clinker composition in order to adjust a content of the agent and encourage a formation of phases.

5. A process according to claim 4, also characterized by the fact that the corrector of the resultant clinker composition is selected from the group consisting of: anhydrite, bastnasite, pyrite, langbeinite, barium, any industrial residue that contains sulfur, desulfurization gases from combustion gases, cement kiln powders and/or mixtures thereof.

6. A Portland cement clinker produced at low temperatures below 1380° C. by burning petroleum coke with a sulfur content of at least 6.5% and without using sulfated compounds in a raw meal, which includes the following phases:
   a) $C_3S$;
   b) $C_2S$;
   c) $C_3A$;
   d) $C_4AF$; and
the clinker being characterized by the formation of the following new phases:
   e) $C_4A_3\bar{S}$; and/or
   f) $C\bar{S}$.

* * * * *